United States Patent [19]

Green

[11] Patent Number: 4,632,052

[45] Date of Patent: Dec. 30, 1986

[54] TORNADO EARLY WARNING DEVICE

[76] Inventor: Marion Green, P.O. Box 205, Kilbourne, La. 71253

[21] Appl. No.: 754,277

[22] Filed: Jul. 12, 1985

[51] Int. Cl.⁴ .............................................. G01L 19/12
[52] U.S. Cl. ...................................... 116/70; 116/112; 73/170 R
[58] Field of Search .................. 116/70, 112; 340/601; 73/170 R

[56] References Cited

U.S. PATENT DOCUMENTS

| | | | |
|---|---|---|---|
| 2,723,388 | 11/1955 | Jacobs | 340/601 |
| 3,717,861 | 2/1973 | Wright | 340/601 |
| 4,215,646 | 8/1980 | Williams | 116/70 |
| 4,249,473 | 2/1981 | Pasternack | 116/70 |

Primary Examiner—Charles Frankfort
Assistant Examiner—Denis E. Corr
Attorney, Agent, or Firm—Morris S. Borenstein

[57] ABSTRACT

A tornado warning device which emits a warning sound when air escapes the said device at a pre-determined rate, with said rate being that of the loss of air pressure in the path of a tornado.

1 Claim, 3 Drawing Figures

TORNADO EARLY WARNING DEVICE

BACKGROUND OF THE INVENTION (1) Field of the Invention

The invention deals generally with a mechanical warning system for the detection of the approach of tornadoes, and more specifically with their detection due to a rapid decrease in air pressure and the subsequent emission of a warning signal.

(2) Description of the Related Art

To the best of applicant's knowledge, information, and belief, no similar mechanical alarm device exists for the warning of an approaching tornado.

SUMMARY OF THE INVENTION

Tornadoes are a natural phenomenon which only occur on the North American continent. Every year, millions of dollars worth of property damage and hundreds of lives are lost due to tornadoes. The phenomenon is caused by the rapid interaction of high and low pressure weather systems.

The high pressure air spirals upward, causing a vacuum, filled by the lower pressure, warmer air.

The path and occurrence of tornadoes are unpredictable, creating danger to those in its path. The only known indicator is that the air pressure in the immediate path of a tornado decreases at a rate of 10 millibars per minute.

Furthermore, tornadoes usually occur during violet thunderstorms, where the possibility of power failure is present.

Accordingly, it is the object of this invention to provide an inexpensive mechanical device to warn people of the imminent approach of a tornado. The device emits a warning signal upon the decrease of air pressure at the rate of 10 millibars per minute.

DETAILED DESCRIPTION OF PREFERRED EMBODIMENT(S)

Figure 1:
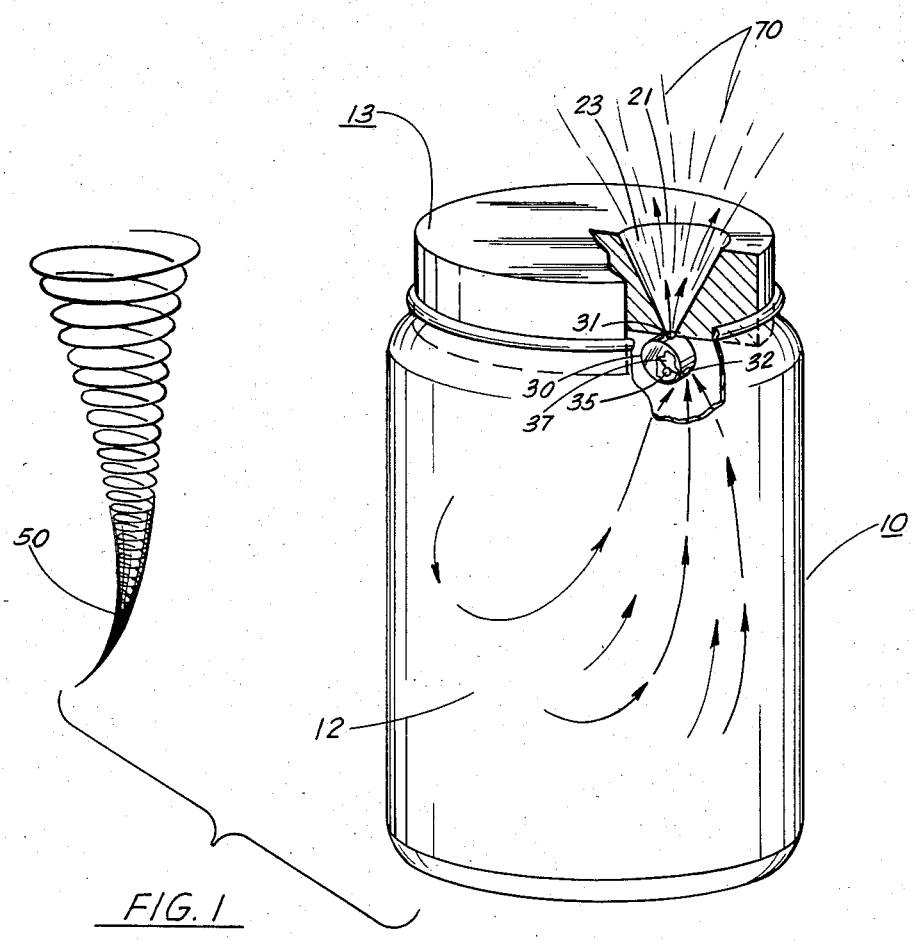
FIG. 1 is a cut-away side view of the invention, of the bead embodiment.
Figure 2:
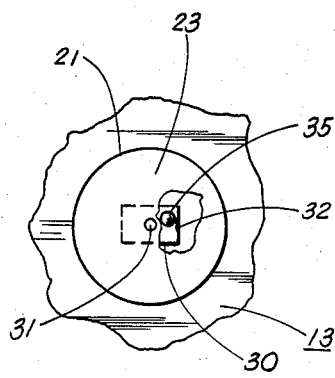
FIG. 2 is a cut-away top view of the invention, of the bead embodiment.
Figure 3:
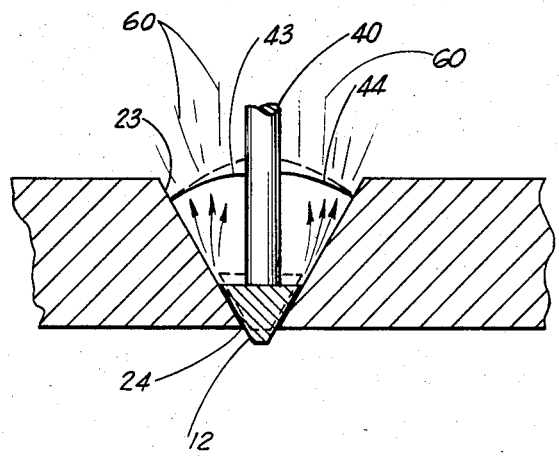
FIG. 3 is a cut-away side view of the plunger sound-generating embodiment of the invention.

A container 10 is filled with air 12 at room temperature and pressure. The container 10 is sealed with a top 13. Top 13 is solid except for orifice 21.

Orifice 21 is vee-shaped 23. At the inward extremity 24 of vee-shaped 23 orifice 21 is container 30. Container 30 has port openings 31 and 32. Port opening 31 opens into orifice 21. Port opening 32 opens into vessel 10, in a direction perpendicular to port opening 31. Container 30 further consists of bead 35.

It is a well-known fact that at the approach of a tornado 50 that the air pressure in the path of the tornado will decrease at the rate of 10 millibars per minute.

If the container 10 is in the path of an approaching tornado 50 the air 12 therein will escape through port opening 32, past bead 35 and out through port opening 31. Bead 35 is weighted such that the escape of a portion of air 12 from container 10 at the rate hereinabove described will cause bead 35 to beat violently about 37 within container 30.

The beating 37 of bead 35 within container 30 will warn those within the path of an approaching tornado 50 of the imminent danger of the tornado 50.

This creates alarm sound 70.

Another embodiment of the present invention is to have plunger 40 within orifice 21. Plunger 40 has plunger head 45 which is seated loosely at the narrow end 24 of vee-shape 23. Plunger head 45 extends slightly beyond narrow end 24. Plunger 40 is held in place by spring means 43 and 44.

Spring means 43 and 44 are set such that the aforementioned pressure change will allow the opening of plunger 40, and the escape of air 12.

The vee-shape 23 of orifice 21 allows for producing of an alarm sound 60, producing the said sound 60 in a manner similar to a teakettle.

It is understood that many equivalent forms of the present invention may be based on the present one, and the one described is but one embodiment of the invention.

I claim:

1. A mechanical alarm warning system responsive to a sudden drop in ambient pressure as experienced at the approach of a tornado comprising; an otherwise sealed container of air exposed to ambient pressure with an orifice, a biased plunger for obstructing said orifice and for allowing a rate of escape of air through said orifice when a drop in said ambient pressure occurs, and an alarm means for generating a sound by the escape of air from said container when said rate of escape of air exceeds a critical level as when said drop in ambient pressure overcomes said biased plunger means to tend to open said orifice.

* * * * *